United States Patent
Osterfeld et al.

(10) Patent No.: US 10,108,166 B2
(45) Date of Patent: Oct. 23, 2018

(54) PLC FUNCTIONAL MODULES FOR ENERGY MANAGEMENT FUNCTIONALITIES

(71) Applicant: Robert Bosch GmbH, Stuttgart (DE)

(72) Inventors: Henning Osterfeld, Lohr-Sendelbach (DE); Stephan Schultze, Lohr-Wombach (DE)

(73) Assignee: Robert Bosch GmbH, Stuttgart (DE)

( * ) Notice: Subject to any disclaimer, the term of this patent is extended or adjusted under 35 U.S.C. 154(b) by 494 days.

(21) Appl. No.: 14/169,262

(22) Filed: Jan. 31, 2014

(65) Prior Publication Data
US 2014/0222170 A1    Aug. 7, 2014

(30) Foreign Application Priority Data

Feb. 6, 2013  (DE) ......................... 10 2013 002 085

(51) Int. Cl.
*G05B 19/05*  (2006.01)
(52) U.S. Cl.
CPC .... *G05B 19/05* (2013.01); *G05B 2219/15121* (2013.01)
(58) Field of Classification Search
CPC combination set(s) only.
See application file for complete search history.

(56) References Cited

U.S. PATENT DOCUMENTS

| | | | | |
|---|---|---|---|---|
| 5,613,115 A * | 3/1997 | Gihl | ...................... | G05B 19/056 700/17 |
| 8,260,736 B1 * | 9/2012 | Lear | ......................... | G06N 5/02 706/46 |
| 8,909,960 B1 * | 12/2014 | Ogami | ................... | G06F 1/3203 323/318 |
| 2003/0088857 A1 * | 5/2003 | Balva | ......................... | G06F 8/20 717/137 |
| 2004/0138787 A1 | 7/2004 | Ransom et al. | | |
| 2005/0085928 A1 * | 4/2005 | Shani | .................... | G05B 19/056 700/18 |
| 2005/0203648 A1 * | 9/2005 | Martin | ................. | G05B 19/052 700/87 |
| 2009/0276060 A1 * | 11/2009 | Lu | ......................... | G05B 19/056 700/21 |

(Continued)

FOREIGN PATENT DOCUMENTS

DE  10 2011 108 964 A1   1/2013
DE  10 2012 025 194 A1   7/2014
EP     2 574 996 A1      4/2013

*Primary Examiner* — Charles E Anya
(74) *Attorney, Agent, or Firm* — Maginot, Moore & Beck LLP (57) ABSTRACT

A method for programming a programmable logic controller for controlling at least one energy consumer of a machine, includes providing at least one energy consumer functional module and at least one energy control functional module in a programming device for selection by a programmer in order to program an energy management program configured to provide at least one energy management functionality for the machine. The at least one energy consumer functional module containing data specific to the at least one energy consumer. The at least one energy control functional module containing data specific to the at least one energy management functionality.

17 Claims, 3 Drawing Sheets

(56) References Cited

U.S. PATENT DOCUMENTS

| | | | |
|---|---|---|---|
| 2010/0131117 A1* | 5/2010 | Mattiocco | G06Q 10/06 700/295 |
| 2010/0223594 A1* | 9/2010 | Kartavov | G06F 8/38 717/106 |
| 2011/0015798 A1* | 1/2011 | Golden | G06Q 10/06 700/291 |
| 2011/0172838 A1 | 7/2011 | Pai et al. | |
| 2012/0004786 A1* | 1/2012 | Lo | G05B 15/02 700/296 |
| 2012/0174059 A1* | 7/2012 | Jaladeen | G06F 8/10 717/105 |
| 2012/0185704 A1* | 7/2012 | Xiao | G05B 19/0426 713/300 |
| 2012/0226368 A1* | 9/2012 | Thomson | G05B 19/0426 700/87 |
| 2012/0330478 A1* | 12/2012 | Malsch | G05B 19/4185 700/297 |
| 2013/0060495 A1* | 3/2013 | Sfaelos | G01D 4/004 702/62 |
| 2013/0124253 A1* | 5/2013 | Cooper | G06Q 10/0633 705/7.26 |
| 2013/0174128 A1* | 7/2013 | Kansal | G06F 11/3062 717/135 |
| 2014/0059518 A1* | 2/2014 | Sierk | G06F 8/34 717/107 |
| 2014/0180492 A1* | 6/2014 | Graf | G05B 19/41865 700/297 |

* cited by examiner

Fig. 4 of such a solution is, in particular, a lack
PLC FUNCTIONAL MODULES FOR ENERGY MANAGEMENT FUNCTIONALITIES This application claims priority under 35 U.S.C. § 119 to patent application no. DE 10 2013 002 085.9, filed on Feb. 6, 2013 in Germany, the disclosure of which is incorporated herein by reference in its entirety.

BACKGROUND

The present disclosure relates to a method for programming a programmable logic controller for controlling at least one energy consumer of a machine.

The disclosure deals with the simplified implementation of energy management in machines with programmable logic controllers (PLC), in particular with possibilities for the simpler programming of a PLC.

In systems which are intended to be optimized with respect to the energy consumption using energy management, there is at least one energy consumer which consumes a different amount of energy in different energy modes, the energy modes being able to be specified. Examples of these are blowers whose speed can be controlled and which are switched off in operating pauses, servo drives whose power supply is switched off during standstill, or heating systems which are operated with a lower desired temperature value in operating pauses. Energy modes are characterized by many characteristic numbers. These are, for example, energy consumption in the respective mode, time needed to change between the modes, energy consumption during the transition operation, minimum/maximum residence times. In addition, there are so-called energy profiles in communication systems, that is to say agreements relating to specified data and their formats. Examples which may be mentioned here are "sercos Energy" or "PROFIEnergy".

Inside the controllers which manage energy, these states are handled in the energy management entity (program part). For this purpose, there are two fundamental energy management functionalities, energy monitoring (energy consumption determination) and energy mode specification. These functionalities can be modeled, for example, in PLCs using functional modules which are processed in the context of the PLC (PLC program). Functional modules usually each contain one or more technologically or functionally associated program instructions. A complete PLC program is generally composed of a plurality of functional modules, in which case the individual modules can be input in different languages based on the PLC application. Functional modules can be supplied with different data with each call (so-called entities) using associated entity data modules.

The entire energy management can be implemented as a program or functional module in conjunction with a declared data structure containing all required energy management data. In this case, the data may be declared in a global list of variables, that is to say they are visible to and can be changed for all PLC program parts.

A suitable data structure may comprise configuration data for the machine (for example list of all energy modes of the machine), configuration data for the energy consumers (so-called devices) (for example list of all energy modes of the devices with their energy consumptions and transition times), HMI data (for example actual energy consumption of the devices), energy management control data (for example desired energy mode, pause time), energy management status data (for example actual energy mode of the machine or of all devices).

The interface to the (higher-level) application program or logic of the energy mode management etc. may be handled using the data structure in this case. The interface to the (lower-level) devices with respect to the control status of the device states can likewise be handled using the data structure (for example using a device application program). The interface to the HMI can also be handled using the data structure.

In this case, the data structure may comprise all data for all energy modes or devices such that the data structure comprises the entire volume of data for maximum expansion from the start, that is to say the storage requirement is tied to the maximum expansion defined.

The disadvantage of such a solution is, in particular, a lack of scalability. In most cases, the data structure is also much too large since the machine being operated usually has not been expanded to the maximum extent. It is particularly disadvantageous that there is a huge and vast pool of variables in which the programmer easily loses track and is undecided as regards which variables he can write or read and which variables are used only internally. The implementation of additional functionalities is very complicated.

It is therefore desirable to simplify the programming of the energy management of a machine.

SUMMARY

The disclosure proposes a method for programming a programmable logic controller for controlling at least one energy consumer of a machine having the features described herein. The subclaims and the following description relate to advantageous refinements.

The disclosure proposes the practice of implementing an energy management program for providing at least one energy management functionality by means of a plurality of different functional modules. At least one energy consumer functional module (so-called device functional module) and one energy control functional module are provided and can be used by a programmer when programming the energy management program. In this case, data which are specific to the energy consumer and are implemented in the device functional modules and data which are specific to the energy functionality (that is to say are independent of the energy consumer) and are implemented in the energy control functional modules are separated. This significantly simplifies programming and makes finished programs, in particular, clearer and easier to understand.

The disclosure facilitates the programming of the energy management of a machine with at least one PLC since the program can be composed from predefined functional modules by the programmer to form a functional module structure. The program can be scaled in any desired manner by adding and interconnecting functional modules. The structure of the energy management is flexible as a result of expandable hierarchical or structuring levels.

Provision is made for a device functional module to be set up, in terms of programming, to control one or more energy consumers, that is to say to trigger the output of corresponding control commands or control signals by the PLC. An energy consumer can preferably be controlled in two ways. According to a first variant, the device functional module internally already comprises the direct control of the energy consumer. This solution is very convenient, but the functionality of the energy consumer must be known in detail to the device functional module for this purpose. This is enabled, for example, using so-called energy profiles in field bus systems (for example sercos Energy, PROFIenergy or CIPenergy) in which the energy consumers have standardized energy modes. It is likewise advantageous if the device functional module can retrieve all information (data, parameters etc.) needed for control from the energy consumer. For this purpose, the latter is provided, in particular, with a storage device which stores the data.

If this possibility of the generic handling of energy consumers is not possible, a second variant is advantageous in which the device functional module has interfaces containing data which must be controlled by the programmer. In this case, the connection between the energy consumer and the device functional module needs to be fully programmed by the programmer.

A device functional module is preferably set up, in terms of programming, to receive or read an item of status information (for example feedback with regard to the energy mode of the energy consumer) from a controlled energy consumer and to provide this status information (or an item of status information generated therefrom) in a readable manner or to transmit it further, with the result that it can be processed further as part of energy management.

Provision is also made for the energy control functional modules to be set up, in terms of programming, to control energy management. The practice of controlling energy management preferably involves coordinating or controlling the device functional modules, in particular with respect to the physical process, on the output side. This preferably involves determining and specifying the respective (individual) energy modes, which are intended to be assumed by the energy consumers, for the associated device functional modules.

An energy control functional module preferably has at least one interface which is used to receive commands on the input side, in particular for specifying an energy mode of the machine or of one or more energy consumers.

Corresponding interfaces (in particular methods) are preferably predefined for interchanging data between the functional modules. This is explained in detail at the end of the description of the figures.

Command functional modules are preferably additionally provided and are set up, in terms of programming, to output operating commands to the energy control functional modules and/or device functional modules. For example, such operating commands comprise the general specification of energy modes (for example, type, times such as duration, start, end, etc.). Furthermore, such operating commands also preferably comprise the specification of boundary conditions for interruptions (for example length of the pause, minimum pause duration, reliable reactivation times etc.) instead of a specific energy mode. With regard to further details, reference is made to the post-published DE 10 2012 025 194.7, the disclosure of which is included here. These operating commands are particularly advantageous for unplanned pauses. The energy control functional modules are preferably set up, in terms of programming, to receive these operating commands, to use them to generate operating commands for the energy consumers and to transmit said commands to the device functional modules which finally accordingly control the energy consumers. For example, the operating commands for the energy consumers are generated in such a manner that the latter are changed to an energy mode which meets the boundary conditions.

Input/output functional modules (HMI functional modules) are preferably additionally provided and contain the man-machine interface for controlling and operating the machine. Said functional modules are expediently set up, in terms of programming, to collect and group data relevant to energy management for visualization purposes and/or to receive user inputs and to forward them to the command functional modules, for example. Data, for example current energy mode of the overall machine, energy modes of the individual consumers, current transition state ("target energy mode reached" or else "in the transition state"), current target energy mode, active (remaining) pause time and error states or information, are typically provided for input/output purposes.

The implementation of the disclosure in the form of software is particularly advantageous since this enables particularly low costs, in particular if an executing computation unit is also used for other tasks and is therefore present anyway. Suitable data storage media for providing the computer program are, in particular, floppy disks, hard disks, flash memories, EEPROMs, CD-ROMS, DVDs and many more. It is also possible to download a program using computer networks (Internet, intranet etc.). PLCs are usually programmed using corresponding software on a programming device (for example an application under Microsoft Windows or Linux on a PC, or a tailored programming system). A computation unit according to the disclosure, for example a programming device for a PLC, is set up, in particular in terms of programming, to carry out a method according to the disclosure.

Further advantages and refinements of the disclosure emerge from the description and the accompanying drawing.

It goes without saying that the features mentioned above and the features yet to be explained below can be used not only in the respectively stated combination but also in other combinations or alone without departing from the scope of the present disclosure.

The disclosure is schematically illustrated in the drawing using exemplary embodiments and is described in detail below with reference to the drawing.

DETAILED DESCRIPTION

Figure 1:
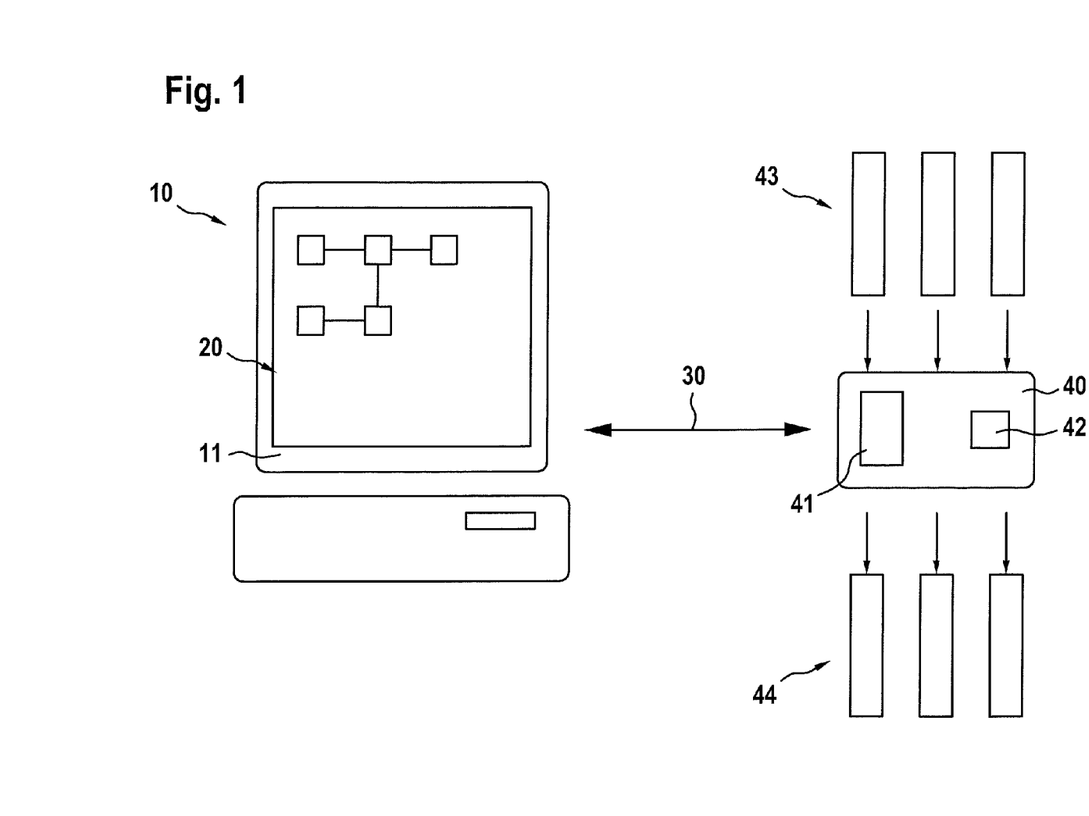
FIG. 1 shows a preferred embodiment of a PLC programming device according to the disclosure in a roughly schematic manner.

FIG. 1 illustrates a preferred embodiment of a PLC programming device 10 in a roughly schematic manner, which device is set up, in terms of programming, to carry out a method according to the disclosure. The PLC programming device 10 may be, for example, a conventional computer on which PLC programming software is executed and which provides a programming environment 20.

The figure shows the operation of programming a PLC 40 by a programmer using the PLC programming device 10.

The PLC programming device 10 is connected to the PLC 40 to be programmed via a corresponding connection 30, for example an Ethernet connection or a serial connection. The PLC 40 at least has a storage device 41 for accommodating the PLC application program produced and a CPU 42 for executing the stored PLC application program. The PLC 40 is also connected to sensors 43 and actuators 44, for example by means of a field bus connection, in particular an Ethernet field bus connection, for example SERCOS III, in order to control a machine (not shown) according to the PLC application program. A sensor is, for example, a temperature, pressure, speed, position sensor etc., but also a switch, rotary knob etc., and is provided for the purpose of recording input variables (for example temperature, pressure, speed, position, position of a switch or a rotary knob). Output variables (for example temperature, pressure, speed, current intensity, voltage, injection quantity, position etc.) are calculated from the input variables by the PLC application program and are set using the actuators (for example electronic switch, relay, valve etc.). The sensors and actuators are usually part of the machine. The actuators are used, in particular, to control energy consumers.

Figure 3:
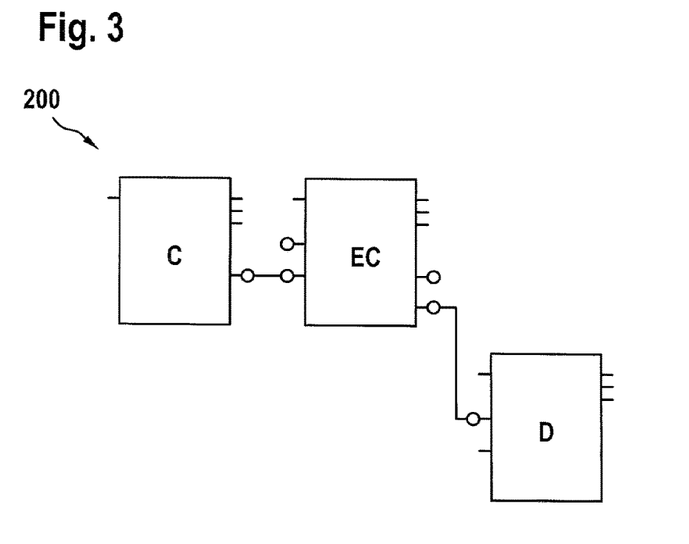
FIG. 3 shows a simple program scheme of an energy management program which is composed of three different functional modules.
Figure 4:
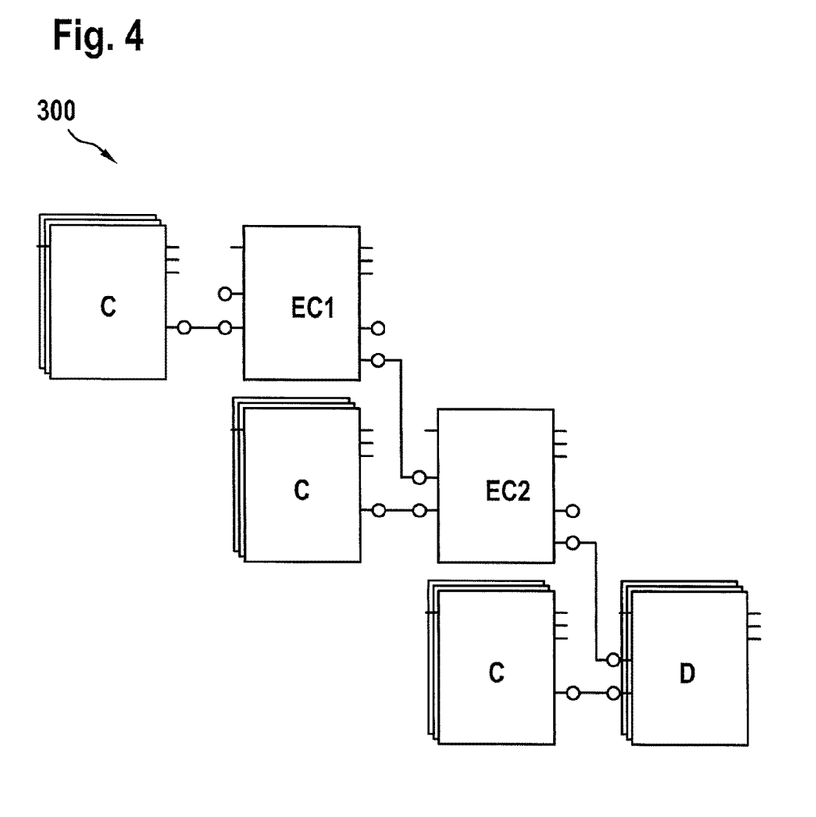
FIG. 4 shows an extended program scheme of an energy management program which has, inter alia, two energy control functional modules.

The programming environment 20 is a programming solution which provides the programmer with a user interface for creating the application program, here with an energy management functionality, in particular. In this case, the programmer defines the application program, for example, by adding program code, functional modules, documentation data and configuration data. The program is displayed on a screen 11 of the programming device 10. Preferred embodiments of energy management programs are illustrated in FIGS. 2 to 4.

Figure 2:
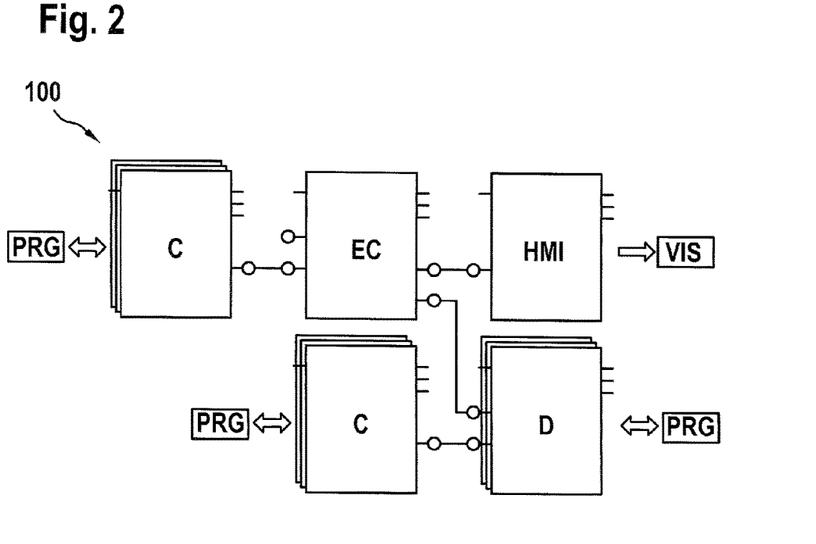
FIG. 2 shows a program scheme of an energy management program which is composed of a plurality of different functional modules.

FIG. 2 schematically shows an excerpt 100 of an energy management program for managing the energy of a machine comprising a plurality of energy consumers, as can be represented, in particular, in a programming environment for a PLC. A number of command functional modules designated "C", an energy control functional module designated "EC", a number of device functional modules designated "D" and an HMI functional module designated "HMI" are illustrated. The functional modules are linked to other parts of the PLC program which are designated "PRG".

The central part of the energy management is the energy control functional module EC which is set up, in terms of programming, to control the entire sequences of the energy management specification. On the lower level are the device functional modules which are the interface to the energy consumers. The energy consumers are controlled and managed by the energy control functional module, that is to say the energy control functional module gives the desired energy mode to a device functional module, for example, which then implements this mode for the devices associated with it.

The command functional modules, on the one hand, may give specifications for the entire machine at the level of the energy control functional module or optionally may also give direct specifications for the energy mode of a device functional module at the device level.

The HMI functional module is set up, in terms of programming, to output visualizations designated "VIS", for example on a screen for a user. The HMI functional module is used to collect data for (different) HMI purposes and to provide said data in a grouped manner. In this case, the required data are contained inside the declared data in the respective functional modules in the case of the object-oriented programming concept (every functional module entity brings its own data along in this case). Just like a control system functional module (not illustrated in FIG. 2), a HMI functional module is therefore used to present these distributed data for the machine operator. This is particularly advantageous in the case of an object-oriented programming concept since these data which are contained inside the respective functional modules are not intended to be able to be accessed from the outside in this case. In this case, the data are preferably provided only using so-called methods (encapsulation of the data). A separate HMI functional module is expediently used for each group of data. For example, the energy control functional module is set up, in terms of programming, to output data to the HMI functional module, which data are generated by the energy control functional module, for example, from status messages received by the energy control functional module from the device functional modules.

The disclosure results in a flexible program architecture which can be scaled in any desired manner since as many functional modules as required can be respectively used, in particular. In particular, one or more device functional modules, one or more command functional modules, none, one or more HMI functional modules and one or more (cf. FIG. 4) energy control functional modules can therefore be used and interconnected. At the same time, it is possible to implement a hierarchy by arranging the functional modules on different levels.

An example of energy management for a machine comprising a consumer is now intended to be explained below with reference to FIG. 3 which shows a simple embodiment 200 of an energy management program having only one command functional module "C", an energy control functional module "EC" and a device functional module "D".

As an example, the command functional module "C" specifies a length of an imminent operating pause (pause time). The energy control functional module "EC" is set up, in terms of programming, to use its internal database to select an appropriate consumer energy mode. In this case, the optimum consumer energy mode in each case is expediently selected using energy-saving attributes (for example minimum pause time, energy consumption of an energy mode, etc.) in order to minimize, for example, the no-load losses in the pause times. The energy control functional module "EC" is set up, in terms of programming, to output the selected consumer energy mode to the device functional module which in turn is set up, in terms of programming, to accordingly control the consumer, with the result that it assumes the desired consumer energy mode.

According to another example, the command functional module "C" specifies a machine energy mode for the machine. The energy control functional module "EC" is set up, in terms of programming, to use its internal database to select an appropriate consumer energy mode. For example, the database of the energy control functional module already comprises a link between the machine energy mode and the consumer energy mode. The energy control functional module is set up, in terms of programming, to output the selected consumer energy mode to the device functional module which in turn is set up, in terms of programming, to accordingly control the consumer, with the result that it assumes the desired consumer energy mode.

The connection of the functional modules is used to link the respective functional modules to their cooperating functional modules. As a result, the interchange of data between the cooperating functional modules can also be automated, in particular. In this case, the functional modules can be connected, for example, by virtue of the functional modules being set up, in terms of programming, to inform each other, at the inputs, of which lower-level or higher-level functional modules are present. An alternative type of connection comprises stating the respectively lower-level functional module in the declaration of a superordinate functional module. This makes it possible for the functional modules to report to each other, for example during an initialization phase of the finished PLC program, and as a result to know their respective entities in order to then interchange data therewith. Said embodiments provide the advantage that the programmer need not program any connection in the PLC program code.

An example of the use of a plurality of energy control functional modules for managing the energy of a machine shall now be explained below with reference to FIG. 4 which shows an embodiment 300 of an energy management program having a plurality of command functional modules "C", two energy control functional modules "EC1" and "EC2" and a plurality of device functional modules "D". The two energy control functional modules "EC1" and "EC2" are hierarchically interconnected, in which case the subordinate energy control functional module "EC2" is set up, in terms of programming, to group a plurality of device functional modules D and to present them to the superordinate energy control functional module "EC1" as a shared resource, such as a single device functional module, that is to say to simulate a device functional module. Further energy control functional modules and/or device functional modules may additionally (not shown) be subordinate to the superordinate energy control functional module "EC1". The grouping using subordinate energy control functional modules can be used in a particularly advantageous manner to structure machine units, in which case each machine unit comprises a plurality of energy consumers and the superordinate energy control functional module only has a view of machine units.

According to one preferred refinement of the disclosure, the functional modules are set up, in terms of programming, to know their respective connected (lower-level or higher-level) functional modules. As a result, they can directly interchange data with these functional modules without an additional application program. This spares the programmer from implementing a program code for copying over the data from the respective functional modules themselves between the functional modules. Otherwise, functional module outputs (status messages) from a device functional module would have to be copied over by the programmer to inputs of an energy control functional module, for example.

In the case of object-oriented programming with the above-described definition of the connection structure in the functional module declaration, the functional modules log onto one another according to the declaration and as a result know the respective corresponding functional modules. This is explained using an example:
fmBasicDevice:  IL_4EE_BasicDeviceType01(fmEnergyControl).

As a result of the declaration, the device functional module "fmBasicDevice" knows which entity of the energy control functional module it is associated with, namely "fmEnergyControl". This provides a unidirectional association.

The device functional module logs onto the superordinate energy control functional module during its initialization phase, with the result that the lower-level device functional module is therefore in turn known to the energy control functional module. This logging-on is expediently carried out using object-oriented methods. For this purpose, the energy control functional module preferably comprises a method (that is to say a call interface) which is called by the device functional module during the initialization phase. This is particularly advantageous since the methods need not be known to the programmer since they are used only by the functional modules for internal communication. Alternatively or additionally, the data of the cyclical transmission are advantageously also transmitted using methods (in particular methods which are not publicly known).

Overall, any data interchange within energy management can therefore be carried out in a concealed manner. Only the interfaces to the application program (cf. PRG in FIG. 2) must be known to the programmer since he must control them in his application program.

Alternatively or additionally, a functional module may have non-documented internal variables, that is to say data which are not applied to the functional module as an input or output. These variables are written and read for communication between functional modules. This is possible, in particular, as a result of the fact that the variable names are known to the other functional modules. In this respect, method calls and data interchange can fundamentally be carried out in an equivalent manner using variables.

What is claimed is:

1. A method for programming a programmable logic controller (PLC) configured to control at least one energy consumer of a machine, the energy consumer having a plurality of consumer energy modes, the method comprising:
    receiving input via a user interface of a programming device operatively connected to the programmable logic controller, the input being indicative of a selection of (i) at least one energy consumer functional module, and (ii) at least one energy control functional module to implement in the programmable logic controller, and
    wherein the at least one energy control functional module is configured, in terms of programming, to:
        receive an operating command indicating at least one machine operating condition, wherein the operating command includes a specification of boundary condition,
        select one of the consumer energy modes for the energy consumer based on the at least one machine operating condition indicated by the operating command, the consumer energy mode being selected to meet the boundary condition,
        output the selected consumer energy mode to the at least one consumer functional module, and
    wherein the at least one consumer functional module is configured, in terms of programming, to control the energy consumer so as to implement the selected consumer energy mode.

2. The method according to claim 1, wherein:
    the at least one energy consumer functional module is configured, in terms of programming, to internally directly control the at least one energy consumer using an energy profile, and
    the energy profile is one of sercos Energy, PROFIenergy, and CIPenergy.

3. The method according to claim 1, wherein the at least one energy consumer functional module is configured, in terms of programming, to receive status information from the at least one energy consumer.

4. The method according to claim 1, wherein the at least one energy consumer functional module is configured, in terms of programming, to log onto the at least one energy control functional module.

5. The method according to claim 1, wherein the at least one energy control functional module is configured, in terms of programming, to control the at least one energy consumer functional module.

6. The method according to claim 1, wherein the at least one energy control functional module is configured, in terms of programming, to simulate the at least one energy consumer functional module.

7. The method according to claim 1, wherein the at least one energy control functional module is configured, in terms of programming, to provide an externally callable log-on method.

8. The method according to claim 1, wherein the at least one energy control functional module is configured, in terms of programming, to control at least one other entity of the energy control functional module.

9. The method according to claim 1, wherein the at least one energy control functional module is configured, in terms of programming, to log onto another entity of the energy control functional module.

10. The method according to claim 1, wherein the input is further indicative of a selection of at least one command functional module,
wherein the command functional module is configured, in terms of programming, to output the operating command.

11. The method according to claim 10, wherein the at least one command functional module is configured, in terms of programming, to log onto the at least one energy control functional module.

12. The method according to claim 10, wherein the operating command of the energy management functionality includes at least one of (i) an energy mode specification, (ii) a pause time, and (iii) an availability time.

13. The method according to claim 10, wherein the at least one energy control functional module is configured, in terms of programming, to convert the operating command of the energy management functionality into an operating command for the at least one energy consumer.

14. The method according to claim 1, further comprising:
selecting at least one input/output functional module, and
wherein the input/output functional module is configured, in terms of programming, to collect and group data relevant to energy management for visualization purposes.

15. A computation unit configured to control at least one energy consumer of a machine, comprising:
a programming device including at least one energy consumer functional module and at least one energy control functional module,
wherein the computation unit is configured to carry out a method for programming a programmable logic controller (PLC) configured to control the at least one energy consumer of a machine, the energy consumer having a plurality of consumer energy modes,
wherein the method includes:
receiving input via a user interface of a programming device operatively connected to the programmable logic controller, the input being indicative of a selection of (i) the at least one energy consumer functional module, and (ii) the at least one energy control functional module to implement in the programmable logic controller, and
wherein the at least one energy control functional module is configured, in terms of programming, to:
receive an operating command indicating at least one machine operating condition, wherein the operating command includes a specification of boundary condition,
select one of the consumer energy modes for the energy consumer based on the at least one machine operating condition indicated by the operating command, the consumer energy mode being selected to meet the boundary condition, and
output the selected consumer energy mode to the at least one consumer functional module, and
wherein the at least one consumer functional module is configured, in terms of programming, to control the energy consumer so as to implement the selected consumer energy mode.

16. The computation unit according to claim 15, wherein a computer program includes a program code configured to cause the computation unit to carry out the method when the program code is executed on the computation unit.

17. A non-transitory machine-readable storage medium connected to a computation unit comprising:
a computer program product including a program code configured to cause the computation unit to carry out a method for programming a programmable logic controller (PLC) configured to control at least one energy consumer of a machine when the program code is executed on the computation unit, the energy consumer having a plurality of consumer energy modes, wherein the method induces:
receiving input via a user interface of a programming device operatively connected to the programmable logic controller, the input being indicative of a selection of (i) the at least one energy consumer functional module, and (ii) the at least one energy control functional module to implement in the programmable logic controller, and wherein the at least one energy control functional module is configured, in terms of programming, to:
receive an operating command indicating at least one machine operating condition, wherein the operating command includes a specification of boundary condition,
select one of the consumer energy modes for the energy consumer based on the at least one machine operating condition indicated by the operating command, the consumer energy mode being selected to meet the boundary condition, and
output the selected consumer energy mode to the at least one consumer functional module, and
wherein the at least one consumer functional module is configured, in terms of programming, to control the energy consumer so as to implement the selected consumer energy mode.

* * * * *

UNITED STATES PATENT AND TRADEMARK OFFICE
CERTIFICATE OF CORRECTION

PATENT NO. : 10,108,166 B2
APPLICATION NO. : 14/169262
DATED : October 23, 2018
INVENTOR(S) : Osterfeld et al.

Page 1 of 1

It is certified that error appears in the above-identified patent and that said Letters Patent is hereby corrected as shown below:

In the Claims

In Column 10, Lines 30-32 of Claim 17 should read:
executed on the computation unit, the energy consumer
having a plurality of consumer energy modes, wherein
the method includes:

Signed and Sealed this
Nineteenth Day of March, 2019

Andrei Iancu
*Director of the United States Patent and Trademark Office*